Patented Jan. 18, 1927.

1,614,913

UNITED STATES PATENT OFFICE.

OSCAR L. BARNEBEY, OF DETROIT, MICHIGAN.

PROCESS FOR THE MANUFACTURE OF DECOLORIZING CARBONS FROM VEGETABLE MATERIALS.

No Drawing.    Application filed March 23, 1921.    Serial No. 454,973.

The chief object of this invention is to utilize waste materials which are now of little or no value by recovering or producing valuable products therefrom.

At the present time, large amounts of vegetable materials are being wasted annually. The stalks or fodder and straws particularly, as such, have little commercial value although they contain various commercially valuable substances such as potassium, sulfur, lime, phosphorus, silicon, etc. Also, chlorine is a waste product in the production of caustic soda by the electrolysis of salt. My invention uses these materials, heretofore largely wasted, to produce products valuable in the various arts.

In carrying out my improved process, to describe it first briefly, I take vegetable plant material, which contains oxides or other oxygen-containing compounds as an inherent part of the plant structure and subject it to a suitable heat treatment to effect carbonization by the driving off of the volatile hydrocarbons. The resulting char is then heated in the presence of chlorine gas at suitable temperatures and chlorides are formed. Of these chlorides, those which are more readily volatile, such as silicon tetrachloride and carbonyl chloride, are removed as gases and recovered as valuable products. The non-volatile chlorides are then extracted from the solid residue with water or other suitable solvent and recovered as salable products. The final residue is a purified carbon material possessing high decolorizing efficiency.

The following vegetable plants are illustrative of the types of materials to which this process is applicable: clover, timothy, corn stalks, flax, buckwheat, wheat, oats, barley and rice straw, kelp, rice husks, in fact the range of adaptation is very large indeed. In general, it may be stated that a large number of vegetable plant materials contain a relatively high percentage of oxides or oxygen containing compounds within their plant structure, and these particularly are adapted to treatment according to this process. However, some materials of relatively lower oxide content may be thus treated.

Of the total inorganic metallic oxide constituents present, usually the potassium oxide content is rather high, for instance, usually betwen 15% and 60%. The sodium oxide is usually low and ordinarily within the range of 0.5% and 9.0%. The iron oxide content ordinarily lies within the range of .5% and 2.0%. Calcium oxide usually falls within the limits of 2% to 40%. Magnesium oxide has for its ordinary limiting percentages 2.5% to 16%. The following oxides of non-metals are found in plants in the following percentages, based on entire oxide content: oxide of phosphorus, 4% to 50%, sulfur trioxide, 0.2% to 8%, and silicon dioxide, 0.5% to 70%. Added to these may be smaller percentages of other oxides amenable to the process herein outlined. Some or all of the iron oxide may be reduced to metallic iron during carbonization; however, its later deportment in the process is the same regardless of this fact.

Referring now in further detail to my improved process, the carbonization of the vegetable material is preferably carried out rather completely so that a very small percentage of uncarbonized material remains. This may be accomplished in a muffle type of furnace with the air excluded, or air may be admitted in a regulated manner to burn all or part of the products of distillation. A final carbonization temperature of 600° C. has been found satisfactory with many materials. However, this temperature may vary to as low as 300° C. and as high as 1000° C. The extremely high temperatures are ordinarily undesirable since some of the valuable products, for instance potassium, distil at elevated temperatures during the carbonization.

The chlorination of the carbonized material is effected by heating the latter in a suitable chamber in the presence of chlorine gas. Temperatures above 450° C. are in general most applicable for the chlorination. As the temperature rises above 450° C., the action becomes more rapid. For many materials, 500° to 700° C. is a very desirable range. However, the invention is not limited to this range, since both limits may be extended, the lower limit when the metallic oxide content of the material is high and the higher limit when the non-metallic oxide content, most especially the silica content, is high. If the temperature of reaction is maintained relatively low, only the most volatile compounds are removed in the reaction, including essentially phosphorus, sulfur, silicon and carbonyl chlorides. As the temperature becomes more elevated, the iron and any aluminum present is volatilized and removed. The quantity of carbonyl chloride (COCl$_2$) increases with increasing temperature. The volatilized chlorides of iron and aluminum are condensed more easily than the phosphorus, sulfur, silicon and carbonyl compounds, hence are readily separated therefrom by fractional condensation. Raising the temperature still farther, potassium is volatilized along with some sodium. However, ordinarily the best practice of carrying out this process is to volatilize the non-metallic elements as chlorinated products and recover them in an appropriate manner and then, after the reaction has been completed, extract the chlorides of the metals from the carbon with a solvent such as water. Any chlorides of iron and aluminum carried over are fractionally separated as above outlined. Further separation can be accomplished by fractional distillation of the volatile portion, by decomposition in water, or by any other conventional means found applicable to the individual case. Likewise, further separation of the extracted metallic chlorides can be accomplished by fractional crystallization or any other conventional method desired.

Heretofore it has been known that mixtures of pulverized carbon and ground oxides when heated in the presence of chlorine yield chlorides. This reaction has been known for a long time as the Wöhler reaction. These reactions as ordinarily conducted are slow and the yields are not as high as desired.

In my process, the chlorine reactions take place with the carbonized materials at the lowest possible temperatures and proceed much more vigorously than with physical mixtures of ground materials. In many cases the reaction between oxides or oxygen containing compounds, carbon and chlorine can be caused to be practically complete, thus requiring very little excess of chlorine. The completeness of utilization of the chlorine in the manufacture of chlorides is very highly desirable from an economic standpoint, and also considering the actual operation in the manufacturing plant, since usually chlorine excess is a bothersome factor either from the point of view of its further utilization or of its discharge into the air or water, the latter causing serious damage to plant and animal growth as well as discomfort to inhabitants of the vicinity.

The theoretical considerations that best explain the rapidity and completeness of the reaction in the case of my process, are that the oxide or oxygen containing compound is held originally in the molecular structure of the plant, and when the plant is carbonized the carbon and the oxide or oxygen containing compounds are in practically molecular contact, thus the surfaces of carbon and oxide or oxygen containing compounds are intimately coinciding, a condition which cannot be obtained by even the finest grinding of the separated ingredient materials. This intimate contacting of carbon and oxides in the presence of chlorine at the proper temperature, then, produces very rapid and complete reaction to form chlorides.

The purified carbon which remains as the final residue, in my process, is a remarkably effective decolorizing material. The reason for such high decolorizing value is that the carbon thus prepared is very porous and has a very open structure due to retention of the plant structure. The removal of the oxides and oxygen compounds has left openings of immense surface areas available for adsorbing the coloring matter of solutions of syrups, acids, oils, etc.

Carbonized vegetable matter frequently contains a very considerable percentage of oxides or oxygen-containing compounds of value. Also, the carbon obtained from the carbonization of such vegetable matters has value. In consequence of the value of the carbon, it is not always desirable to burn up the carbon as has been done in some cases in the past, thus wasting this valuable material to obtain the residual non-combustible materials containing oxides or oxygen-containing compounds of the metals desired, and further such ashing gives no separation of the ash constituents. By following my invention and carbonizing the vegetable materials and causing interaction of the carbonized products and chlorine, the metallic and non-metallic elements are converted into chlorides, separated in whole or part from each other, and the carbon obtained as a residual material after the treatment.

Obviously, the products recovered by my process can be utilized in various ways. In the growth of plants, the growing vegetation subtracts certain constituents from the soil. In time the soil becomes depleted of them and certain of the constituents must be put back into the soil as fertilizers. By the recovery of such of the potassium, sulfur, lime, phosphorus, etc. as exists in the waste materials such as fodders and straw, and returning them to the soil, great economy results. In instances where the products recovered have greater value under prevailing market conditions for purposes other than fertilization or where special products are produced especially adapted for other purposes, these products will find their market through other avenues. For instance, the potassium may be converted into pure potassium compounds, the phosphorus into phosphoric acid, the silicon into gas adsorbent silica, the carbon into special forms of decolorizing carbon or into other carbonaceous materials.

The following examples will serve to illustrate the adaptability of my invention to certain specific carbonized plant materials:

*Example I.*

Rice hulls contain a very high percentage of silicon as inherent part of their plant structure. When this material is carbonized, as by heating to 600° C. for twenty minutes in a retort, the silicon is converted to silicon dioxide and other ash constituents are converted into their respective oxides and oxygen-containing compounds. The carbon, in the meantime, is converted to elemental form containing more or less quantities of hydrocarbons which have not been completely decomposed by carbonization. When such carbonized rice material is heated in a suitable chamber to above 600° C. in a current of chlorine, there is a reaction which, according to my understanding is represented by the equation $$SiO_2 + 2C + 4Cl_2 = SiCl_4 + 2COCl_2.$$

The silicon tetrachloride is very rapidly formed and escapes as a volatile material which can be condensed to a liquid silicon tetrachloride. The reaction will proceed as low as 450° C. but the reaction is slow at such temperatures. A very satisfactory temperature is 650° C. However, the reaction can be satisfactorily carried out at much higher temperatures. The reaction is so vigorous that it can be caused to be practically complete. A considerable amount of carbonyl chloride (phosgene) is formed by this reaction, particularly at the higher temperatures. The phosgene, however, is readily separated from silicon tetrachloride inasmuch as its boiling point is very much lower than the latter. By the use of water cooling the silicon tetrachloride can be condensed, and by the use of brine cooling, particularly with the aid of pressure, the phosgene can be condensed to its liquid form. The inorganic chlorides are removed from the carbon residue by water extraction, after which the carbon is dried. The residual carbon is a very active decolorizing and gas absorbing material and can be sold as such or for any other useful purpose.

*Example II.*

Timothy fodder ash contains a high percentage of potassium oxide and oxide of phosphorus, more than the usual amounts of oxide of calcium, along with lesser amounts of other oxides. When the carbonized fodder is treated with chlorine at redness the silicon is volatilized as the tetrachloride and upon passing the gases into water this is decomposed into gelatinous silicic acid which is insoluble and is filtered off. The silicic acid after washing may be dried and sold as purified gas adsorbent silica or marketed in any other desired manner. The volatile phosphorus and sulfur compounds are also decomposed by water forming soluble phosphoric and sulfuric acids which can be removed and used for manufacture of fertilizer or other useful purposes. The non-volatile material is extracted with water, and after filtering the carbon is washed and dried. The water extraction of the carbon residue yields a chloride mixture high in potassium and calcium content. From the solution the ingredients may be separated or evaporated to dryness and used for fertilizing the soil. The carbon is marketed as such.

I have discovered that not only is the carbon produced by this method very excellent for decolorizing solutions, but it is also a very excellent adsorbent for gases and finds application industrially for that purpose.

The examples given above are only illustrative, and the invention is not limited to the examples given since the general treatment is applicable to a wide range of vegetable materials both as to kind and quality. Further, the above description and examples are given to illustrate the wide range of the invention and not to define the scope of the invention inasmuch as many variations in procedure can be made to accomplish the purpose of the invention. For example, the non-volatile material after treatment with chlorine may be best extracted in some cases with an acid solution, preferably used hydrochloric acid. Again, the temperature of carbonizing the vegetable matter may be varied to a considerable extent, although the hydrocarbons should be removed rather completely previous to the treatment, to obtain the best results. Still again, the temperature of chlorination may be sufficiently high to volatilize all or practically all the chlorides formed and thus not require the use of a solvent action to separate the chlorides or purify the carbon residue.

What I claim is:

1. In a process of treating vegetable carbonaceous materials to separate and recover constituents thereof, the steps which comprise carbonizing said materials, thereafter heating the carbonized product in the presence of chlorine so as to volatilize and separate certain of the chlorides thus produced, extracting soluble chlorides remaining in the residue, and washing the residual carbon free from impurities.

2. In a process of treating vegetable carbonaceous materials for the economic utilization of constitutents thereof, the steps which comprise carbonizing said materials, thereafter heating the carbonized materials in the presence of chlorine so as to volatilize and separate certain of the chlorides thus produced, and extracting soluble chlorides remaining in the residue.

3. In a process of treating vegetable carbonaceous materials for the economic utilization of constituents thereof, the steps which comprise carbonizing said materials, and thereafter heating the carbonized materials in the presence of chlorine so as to volatilize and separate certain of the chlorides thus produced.

4. In a process of treating vegetable carbonaceous materials for the economic utilization of constituents thereof, the steps which comprise carbonizing said materials, and thereafter heating the carbonized materials in the presence of chlorine at temperatures above 450° C.

5. Decolorizing and gas adsorbent carbons of vegetable origin substantially free from metallic and non-metallic oxygen-containing compounds.

6. Decolorizing and gas adsorbent carbons of vegetable origin substantially free from metallic oxygen-containing compounds.

7. Decolorizing and gas adsorbent carbons of vegetable origin substantially free from non-metallic oxygen-containing compounds.

8. In a process of treating vegetable carbonaceous materials containing silica for the economic utilization of constituents thereof, the steps which comprise carbonizing said materials, heating the carbonized materials in the presence of chlorine at temperatures causing the latter to react with the silica to produce silicon tetrachloride, and volatilizing the silicon tetrachloride thus produced.

9. In a process of treating vegetable carbonaceous materials containing silica for the economic utilization of constituents thereof, the steps which comprise carbonizing said materials, heating the carbonized materials in the presence of chlorine at temperatures causing the latter to react with the silica to produce silicon tetrachloride, volatilizing the silicon tetrachloride thus produced, converting other oxides to chlorides, and separating and collecting said chlorides.

10. In a process of treating vegetable carbonaceous materials for the economic utilization of constituents thereof, the steps which comprise carbonizing said materials, heating the carbonized materials in the presence of chlorine at temperatures causing the latter to react with the oxides present and some of the carbon to produce carbonyl chloride, and volatilizing said carbonyl chloride.

11. In a process of treating vegetable carbonaceous materials for the economic utilization of constituents thereof, the steps which comprise carbonizing said materials, heating the carbonized materials in the presence of chlorine at temperatures causing the latter to react with the oxides present and some of the carbon to produce carbonyl chloride, volatilizing said carbonyl chloride, and collecting and condensing said carbonyl chloride.

12. In a process of treating vegetable carbonaceous materials containing silica for the economic utilization of constituents thereof, the steps which comprise carbonizing said materials, heating the carbonized materials in the presence of chlorine at temperatures causing the latter to react with the silica present and some of the carbon to convert the silica to silicon tetrachloride and form carbonyl chloride, and volatilizing said chlorides.

13. In a process of treating vegetable carbonaceous materials containing silica for the economic utilization of constituents thereof, the steps which comprise carbonizing said materials, heating the carbonized materials in the presence of chlorine at temperatures causing the latter to react with the silica present and some of the carbon to convert the silica to silicon tetrachloride and form carbonyl chloride, volatilizing said chlorides, removing said volatile products, and cooling and condensing said silicon tetrachloride and carbonyl tetrachloride.

14. In a process of treating vegetable carbonaceous materials containing silica for the economic utilization of constituents thereof, the steps which comprise carbonizing said materials, heating the carbonized materials in the presence of chlorine at temperatures causing the latter to react with the silica present and some of the carbon to convert the silica to silicon tetrachloride and form carbonyl chloride, volatilizing said chlorides, removing said volatile products, and separating the silicon tetrachlorides and carbonyl chlorides.

15. In a process of treating vegetable carbonaceous materials for the economic utilization of constituents thereof, the steps which comprise carbonizing said materials, heating the carbonized materials in the presence of chlorine at temperatures causing the latter to react with oxides present and some of the carbon to produce volatile silicon tetrachloride and carbonyl chloride along with lesser amounts of volatile chlorides of sulphur and phosphorus, removing said volatile chlorides, and collecting, condensing and separating said chlorides.

16. In a process of treating vegetable carbonaceous materials for the economic utilization of constituents thereof, the steps which comprise carbonizing said materials, heating the carbonized materials in the presence of chlorine at temperatures causing the latter to react with oxides present and some of the carbon to produce volatile silicon tetrachloride and carbonyl chloride along with lesser amounts of volatile chlorides of sulphur and phosphorus, removing said volatile chlorides, extracting soluble chlorides from the non-volatile residue, and separating said soluble chlorides.

17. In a process of treating vegetable carbonaceous materials for the economic utilization of constituents thereof, the steps which comprise carbonizing said materials, heating the carbonized materials in the presence of chlorine at temperatures causing the latter to react with oxides present and some of the carbon to produce volatile silicon tetrachloride and carbonyl chloride along with lesser amounts of volatile chlorides of sulphur and phosphorus, removing said volatile chlorides, extracting soluble chlorides from the non-volatile residue, separating said soluble chlorides, and washing the residual carbon free from impurities.

18. In a process of treating vegetable carbonaceous materials for the economic utilization of constituents thereof, the steps which comprise carbonizing said materials, heating the carbonized materials in the presence of chlorine at temperatures causing the latter to react with oxides present and some of the carbon to produce volatile silicon tetrachloride and carbonyl chloride along with lesser amounts of volatile chlorides of sulphur and phosphorus, removing said volatile chlorides, extracting soluble chlorides from the non-volatile residue, separating said soluble chlorides, washing the residual carbon free from impurities, and drying the carbon thus produced.

In testimony whereof, I hereunto affix my signature.

OSCAR L. BARNEBEY.

rides from the non-volatile residue, and separating said soluble chlorides.

17. In a process of treating vegetable carbonaceous materials for the economic utilization of constituents thereof, the steps which comprise carbonizing said materials, heating the carbonized materials in the presence of chlorine at temperatures causing the latter to react with oxides present and some of the carbon to produce volatile silicon tetrachloride and carbonyl chloride along with lesser amounts of volatile chlorides of sulphur and phosphorus, removing said volatile chlorides, extracting soluble chlorides from the non-volatile residue, separating said soluble chlorides, and washing the residual carbon free from impurities.

18. In a process of treating vegetable carbonaceous materials for the economic utilization of constituents thereof, the steps which comprise carbonizing said materials, heating the carbonized materials in the presence of chlorine at temperatures causing the latter to react with oxides present and some of the carbon to produce volatile silicon tetrachloride and carbonyl chloride along with lesser amounts of volatile chlorides of sulphur and phosphorus, removing said volatile chlorides, extracting soluble chlorides from the non-volatile residue, separating said soluble chlorides, washing the residual carbon free from impurities, and drying the carbon thus produced.

In testimony whereof, I hereunto affix my signature.

OSCAR L. BARNEBEY.

Certificate of Correction.

Patent No. 1,614,913.          Granted January 18, 1927, to

OSCAR L. BARNEBEY.

It is hereby certified that error appears in the printed specification of the above-mentioned patent requiring correction as follows: Page 3, line 101, for the word "used" read *using;* and that the said Letters Patent should be read with this correction therein that the same may conform to the record of the case in the Patent Office.

Signed and sealed this 15th day of March, A. D. 1927.

[SEAL.]
M. J. MOORE,
*Acting Commissioner of Patents.*

Certificate of Correction.

Patent No. 1,614,913.                                                            Granted January 18, 1927, to

OSCAR L. BARNEBEY.

It is hereby certified that error appears in the printed specification of the above-mentioned patent requiring correction as follows: Page 3, line 101, for the word "used" read *using;* and that the said Letters Patent should be read with this correction therein that the same may conform to the record of the case in the Patent Office.

Signed and sealed this 15th day of March, A. D. 1927.

[SEAL.]                                                            M. J. MOORE,
*Acting Commissioner of Patents.*